United States Patent
Snyder et al.

(10) Patent No.: US 12,176,744 B2
(45) Date of Patent: Dec. 24, 2024

(54) BATTERY CHARGER WITH MOVABLE HANDLE

(71) Applicant: MILWAUKEE ELECTRIC TOOL CORPORATION, Brookfield, WI (US)

(72) Inventors: Joel D. Snyder, Milwaukee, WI (US); Casey L. Bonath, Milwaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 167 days.

(21) Appl. No.: 17/532,238

(22) Filed: Nov. 22, 2021

(65) Prior Publication Data

US 2022/0166236 A1    May 26, 2022

Related U.S. Application Data

(60) Provisional application No. 63/116,974, filed on Nov. 23, 2020.

(51) Int. Cl.
*H02J 7/00* (2006.01)

(52) U.S. Cl.
CPC .......... *H02J 7/0045* (2013.01); *H02J 7/0042* (2013.01); *H02J 7/007* (2013.01)

(58) Field of Classification Search
CPC ......... H02J 7/007; H02J 7/0042; H02J 7/0045
USPC .......................................... 320/107, 113, 115
See application file for complete search history.

(56) References Cited

U.S. PATENT DOCUMENTS

| | | | |
|---|---|---|---|
| 5,939,858 A | 8/1999 | Dodd et al. | |
| 9,112,356 B2 | 8/2015 | Cover | |
| 10,618,692 B2 | 4/2020 | Hori et al. | |
| 2003/0085686 A1* | 5/2003 | Haga | H02J 7/0045 320/112 |
| 2005/0024021 A1* | 2/2005 | Zeiler | H02J 7/0042 320/134 |
| 2005/0151507 A1 | 7/2005 | Smith | |
| 2011/0006729 A1* | 1/2011 | Matthias | H02J 7/0042 320/107 |

(Continued)

FOREIGN PATENT DOCUMENTS

| | | |
|---|---|---|
| CN | 201405719 Y | 2/2010 |
| CN | 2299516 B1 | 10/2013 |

(Continued)

OTHER PUBLICATIONS

International Search Report and Written Opinion for Application No. PCT/US2021/060299 dated Mar. 14, 2022 (10 pages).

(Continued)

*Primary Examiner* — Edward Tso
*Assistant Examiner* — Aaron Piggush
(74) *Attorney, Agent, or Firm* — Michael Best & Friedrich LLP

(57) ABSTRACT

A battery charger usable with rechargeable battery. The battery charger includes a housing and a handle. The housing includes a connection rail. The connection rail slidably interfaces with the rechargeable battery. The connection rail extends parallel to a plane. The handle is movably coupled to the housing. The handle can be positioned in at least a first position and a and a second position. In the first position, at least a portion of the handle intersects with the plane. In the second position, the plane is not obstructed by the handle.

25 Claims, 4 Drawing Sheets

(56) References Cited

U.S. PATENT DOCUMENTS

| | | | |
|---|---|---|---|
| 2014/0361740 A1* | 12/2014 | Suzuki | H02J 7/0045 |
| | | | 320/108 |
| 2015/0303717 A1 | 10/2015 | Schneider et al. | |
| 2016/0251115 A1* | 9/2016 | Barry | B25H 3/006 |
| | | | 220/23.4 |
| 2018/0169851 A1 | 6/2018 | Radovich et al. | |

FOREIGN PATENT DOCUMENTS

| | | |
|---|---|---|
| CN | 205050897 U | 2/2016 |
| CN | 206789594 U | 12/2017 |
| CN | 105870376 B | 5/2018 |
| CN | 207529981 U | 6/2018 |
| JP | 2007188717 A | 7/2007 |
| KR | 1020040064153 A | 7/2004 |

OTHER PUBLICATIONS

Extended European Search Report for Application No. 21895748.8 dated Nov. 8, 2024 (10 pages).

* cited by examiner

BATTERY CHARGER WITH MOVABLE HANDLE

CROSS-REFERENCE TO RELATED APPLICATIONS

This claims the benefit of U.S. Provisional Patent Appl. No. 63/116,974, filed Nov. 23, 2020, the content of which is incorporated fully herein by reference.

FIELD OF THE INVENTION

The present disclosure relates to battery chargers. More particularly, the present disclosure relates to a battery charger for battery packs commonly used with power tools.

SUMMARY

In one aspect, the present disclosure includes a battery charger according to embodiments disclosed herein. The battery charger is usable with a rechargeable battery. The battery charger includes a housing and a handle. The housing includes a connection rail. The connection rail slidably interfaces with the rechargeable battery. The connection rail extends parallel to a plane. The handle is movably coupled to the housing. The handle can be positioned in at least a first position and a and a second position. In the first position, at least a portion of the handle intersects with the plane. In the second position, the plane is not obstructed by the handle.

In another aspect, the battery charger includes a housing and a handle. The housing defines a battery receiving area having a battery entry end and a longitudinal axis. The longitudinal axis extends through the battery entry end. The handle is movably coupled to the housing. The handle can be positioned in at least a first position and a second position. In the first position, at least a portion of the handle obstructs at least a portion of the battery entry end in a direction parallel to the longitudinal battery sliding axis. In the second position, the battery entry end is unobstructed by the handle in the direction parallel to the longitudinal battery sliding axis.

In another aspect, the invention provides a method of coupling a rechargeable battery to a battery charger. The method includes sliding the rechargeable battery along a connection rail. In a next step, the method includes engaging terminals of the battery charger with corresponding batter terminals of the rechargeable battery. Subsequently, the method includes moving a handle of the battery charger to a first position from a second position to obstruct removal of the rechargeable battery.

Features and aspects of the disclosure will become apparent by consideration of the following detailed description and accompanying drawings.

Figure 1:
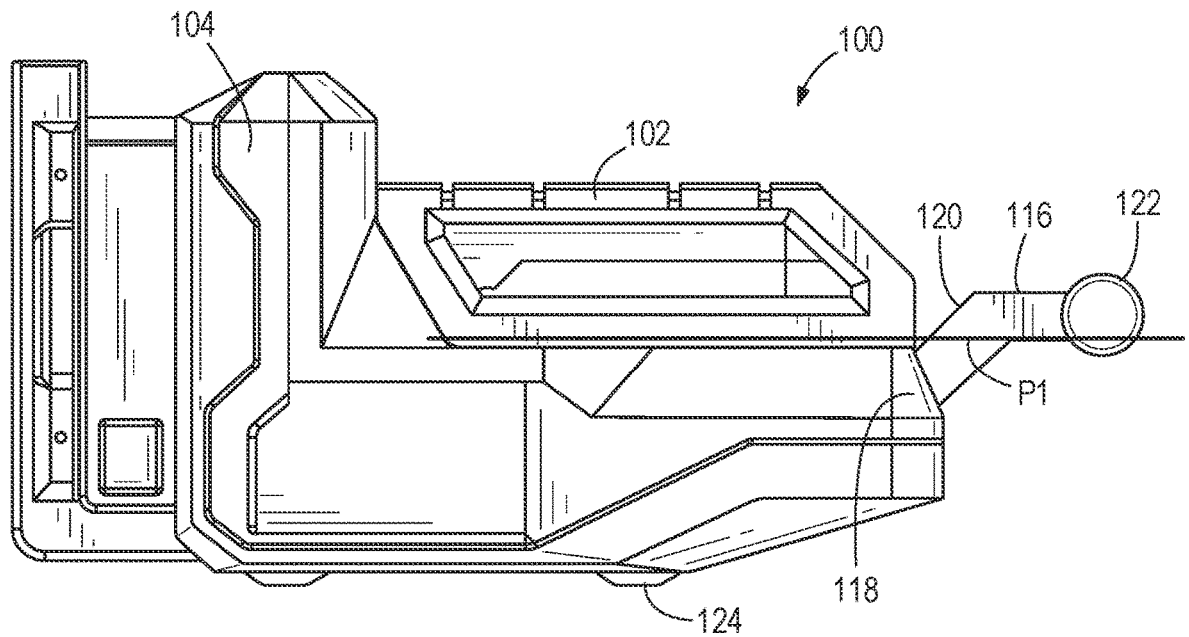
FIG. 1 is a side elevation view of a battery charger with a battery pack coupled thereto, according to embodiments disclosed herein.

Before any embodiments of the disclosure are explained in detail, it is to be understood that the disclosure is not limited in its application to the details of construction and the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting.

With reference to FIG. 1, an embodiment of a battery charger 100 is shown. The battery charger 100 is illustrated with a rechargeable battery 102 removably coupled thereto. The battery charger 100 includes a housing 104. The housing includes a connection rail 106 (schematically shown in FIG. 5) extending parallel to a plane P1. The connection rail 106 allows the rechargeable battery 102 to slidably couple to the battery charger 100 in a direction extending parallel to the plane P1, such as along a longitudinal battery sliding axis A1.

The battery charger 100 further includes charging terminals 108 (schematically shown in FIG. 5) configured to electrically couple with corresponding battery terminals 110 of the rechargeable battery 102. Upon sliding the rechargeable battery 102 along the connection rail 106, the battery terminals 110 of the rechargeable battery 102 contact the charging terminals 108 of the battery charger 100 when the rechargeable battery 102 is in an installed position (as shown in FIG. 1). The rechargeable battery 102 is moved from a position remote from the battery charger 100 (as shown in FIG. 5) to the installed position (as shown in FIG. 1) by first entering a battery entry end 112 of a battery receiving area 114.

Figure 5:
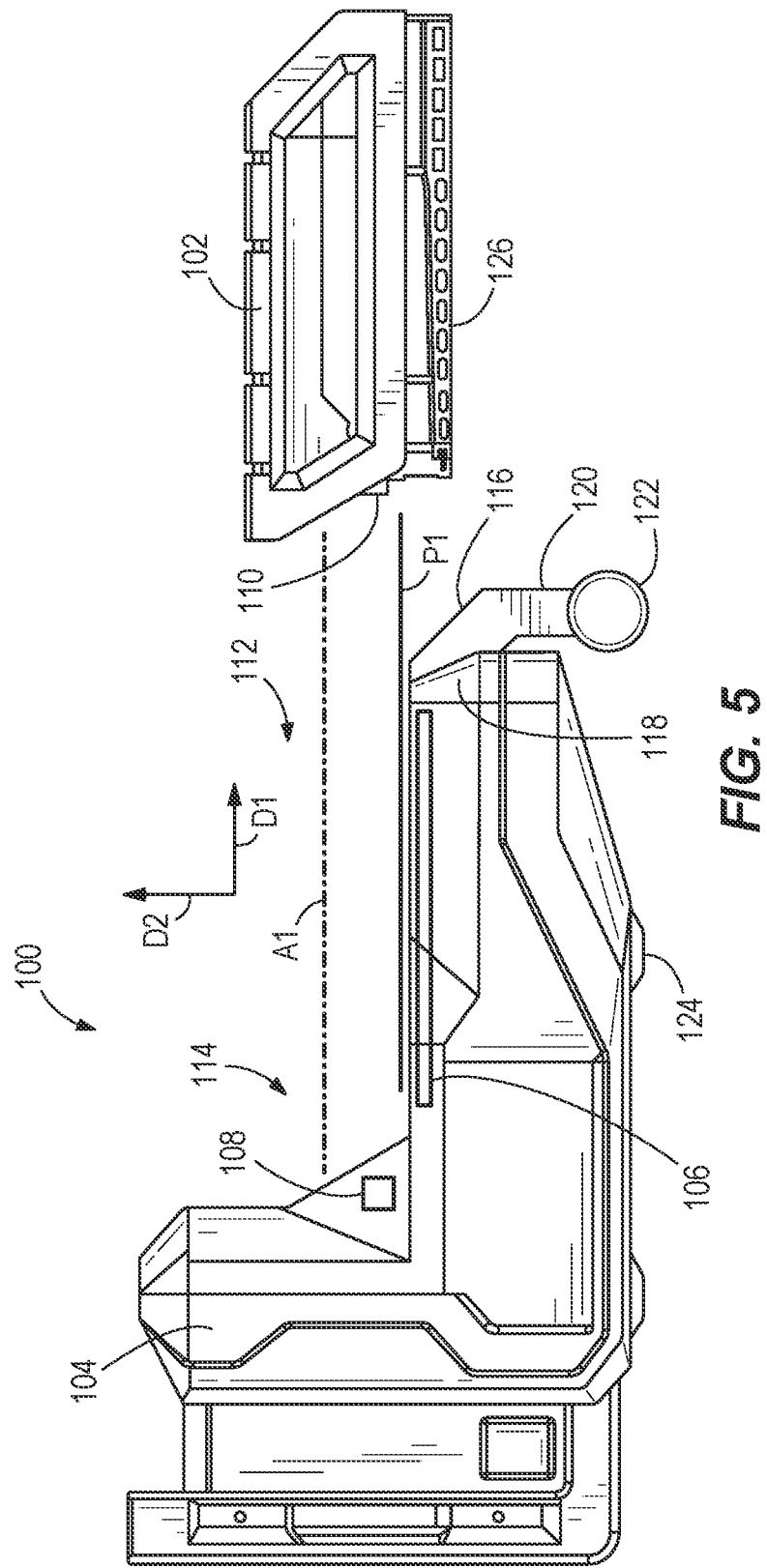
FIG. 5 is a side elevation view of the battery charger and battery pack of FIG. 1 with the battery pack removed from the battery charger.
Figure 6:
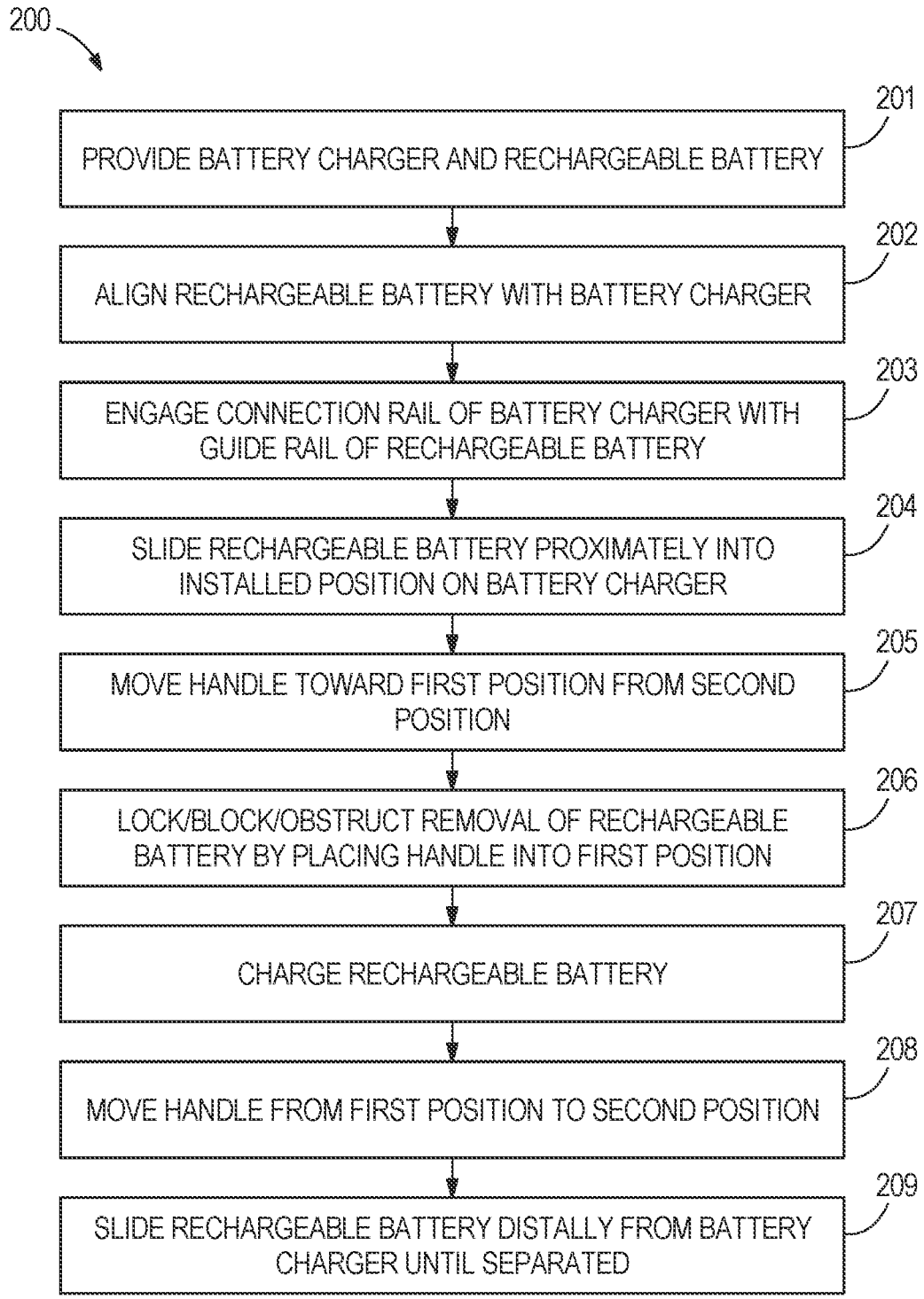
FIG. 6 is a schematic illustration of a method of using the battery charger of FIG. 1.

As shown in FIG. 5, the battery receiving area 114 is defined by the housing 104. In the illustrated embodiment, the battery receiving area 114 is bordered on one side by the connection rail 106. Also, in the illustrated embodiment, the battery receiving area 114 is open in two perpendicular directions D1, D2 away from the housing 104. Engagement of the connection rail 106 with rechargeable battery 102, in the installed position, restricts movement of the rechargeable battery 102 relative to the housing 104 in the D2 direction. In some embodiments, the charging terminals 108 are disposed in the battery receiving area 114 opposite the battery entry end 112.

As shown in FIG. 1, the battery charger 100 further includes a handle 116 movably coupled to the housing 104. The handle 116 is pivotable relative to the housing 104 in the illustrated embodiment, but other embodiments may include a slidable connection or some other movable connection between the handle 116 and the housing 104. Also in the illustrated embodiment, the handle 116 is disposed on a longitudinal end 118 of the housing 104, particularly the longitudinal end 118 adjacent the battery entry end 112 of the battery receiving area 114. The handle 116 may be mounted to the housing 104 in other locations, however.

Figure 4:
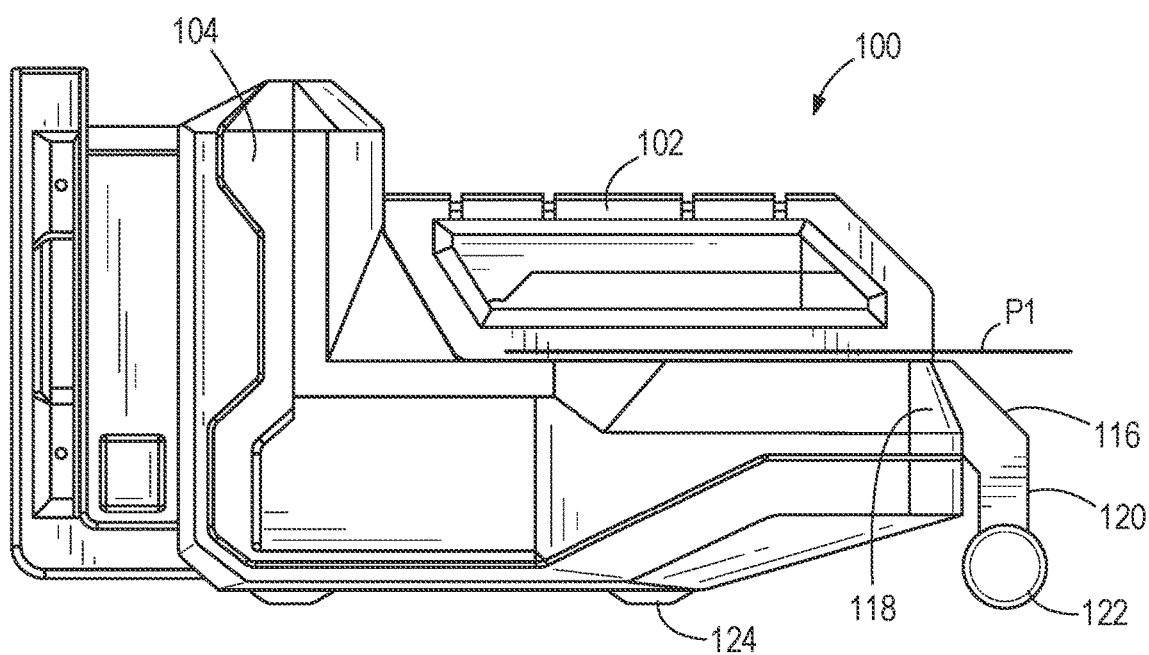
FIG. 4 is a side elevation view of the battery charger and battery pack of FIG. 1 with the handle of the battery charger in a clearance position.

The handle 116 is movable between at least a first position (as shown in FIG. 1) and a second position (as shown in FIG. 4). In the first position (FIG. 1), while the rechargeable battery 102 is in the installed position, the handle 116 locks the rechargeable battery 102 in place on the battery charger 100 or otherwise obstructs or blocks removal of the rechargeable battery 102 from the battery charger 100. In some embodiments, in the first position, at least a portion of the handle 116 intersects with the plane P1 along which the connection rail 106 extends. In some embodiments, in the first position, at least a portion of the handle 116 obstructs at least a portion of the battery entry end 112 in a direction D1 that is parallel to the longitudinal battery sliding axis A1.

Figure 3:
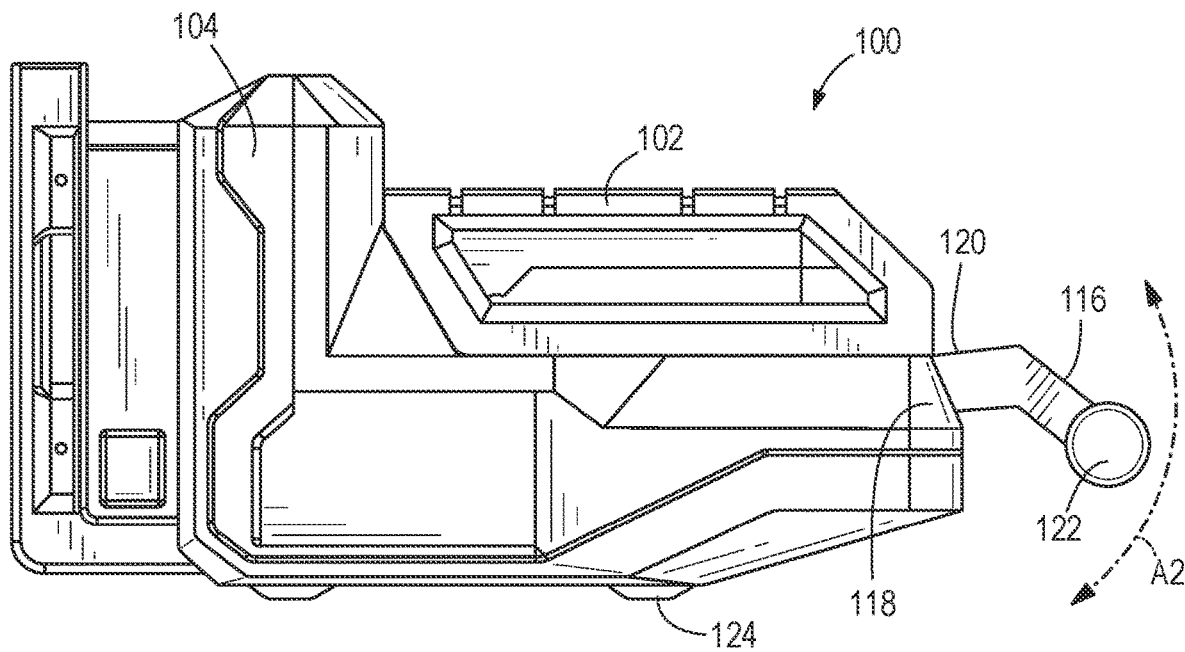
FIG. 3 is a side elevation view of the battery charger and battery pack of FIG. 1 with the handle of the battery charger moving.

As shown in FIG. 3, the handle 116 is capable of moving from the first position (FIG. 1) to the second position (FIG. 4). As mentioned above, the illustrated embodiment includes the handle 116 pivoting relative to the housing 104. As such, the handle 116 is illustrated as pivoting along a pivot arc A2 from the first position toward the second position (or vice versa).

Referring now to FIG. 4, the handle 116 is shown in the second position. In the second position, the handle 116 is positioned such that removal of the rechargeable battery 102 from the battery charger 100 is unobstructed. In some embodiments, in the second position, the plane P1 along which the connection rail 106 extends is unobstructed by the handle 116. In some embodiments, in the second position, the battery entry end 112 of the battery receiving area 114 is unobstructed by the handle 116 in the direction D1 parallel to the longitudinal battery sliding axis A1.

Figure 2:
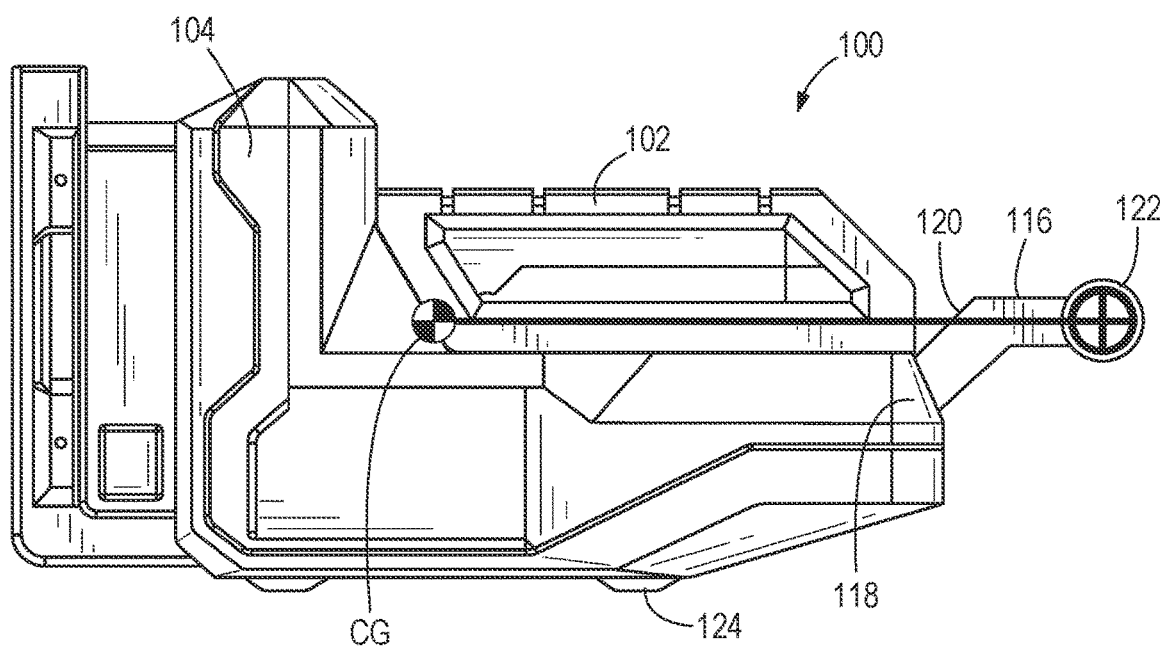
FIG. 2 is a side elevation view of the battery charger and battery pack of FIG. 1 with a center of gravity schematically superimposed thereon.

In the illustrated embodiment, the handle 116 includes an extension portion 120 and a grip portion 122. The extension portion 120 is pivotably coupled to the housing 104, and the grip portion 122 is coupled to an end of the extension portion 120. Of course, other handle constructions are also contemplated herein. As shown in FIG. 2, in the first position, the illustrated embodiment includes the grip portion 122 of the handle 116 aligned with a center of gravity CG of a combination of the battery charger 100 and the rechargeable battery 102. The alignment of the handle 116 and the center of gravity CG is along the direction D1 that is parallel to the plane P1.

In other embodiments, the handle 116 may be movable between other non-illustrated positions. In some embodiments, the handle 116 may be located in a first position in which the grip portion 122 is aligned with the center of gravity CG of the combination of the battery charger 100 and the rechargeable battery 102, but the alignment may be along a different direction that is not parallel to the plane P1. In some embodiments, the grip portion 122 may align with the center of gravity CG along a direction (D2, for instance) that is perpendicular to the plane P1. Still other embodiments may include the grip portion 122 aligned with the center of gravity CG along some other direction that is oblique relative to the plane P1.

In the illustrated embodiment, the battery charger 100 further includes at least one foot 124 that is configured to engage a support surface on which the battery charger 100 rests. In some embodiments, the at least one foot 124 and the handle 116 are shaped, sized, and/or positioned such that the handle 116 does not collide with a support surface when the handle 116 is in the second position (FIG. 4). In some embodiments, at least a portion of the handle 116 is nearer a foot 124 with the handle 116 in the second position than with the handle 116 in the first position.

The present disclosure also contemplates a method 200 of using the battery charger 100. The method 200 includes providing the battery charger 100 and a rechargeable battery 102 (step 201). With the handle 116 in the second position (FIG. 5), the rechargeable battery 102 is aligned with the battery charger 100 such that a guiding rail 126 of the rechargeable battery 102 can be placed into engagement with the connection rail 106 of the battery charger 100 (step 202). Once the guiding rail 126 and the connection rail 106 are aligned, the rechargeable battery 102 is placed into sliding engagement with the battery charger 100 (step 203). Then, the rechargeable battery 102 is slid proximately into the battery charger 100 until the rechargeable battery 102 reaches the installed position shown in FIG. 4 (step 204). Upon reaching the installed position (FIG. 4), the battery terminals 110 come into contact with the charging terminals 108 such that electricity may pass through the connection. With the rechargeable battery 102 in the installed position, the handle 116 is moved from the second position toward the first position, such as along the pivot arc A2 shown in FIG. 3 for the illustrated embodiment (step 205). The method 200 further includes locking, blocking, or otherwise obstructing at least a portion of the rechargeable battery 102 upon placing the handle 116 in the first position (FIG. 1) such that removal of the rechargeable battery 102 is rendered either impossible or at least rendered more difficult than when the handle 116 is in the second position (step 206). Once the rechargeable battery 102 is in the installed position and the handle 116 is in the first position, the rechargeable battery 102 is then charged by the battery charger 100 (step 207).

Once the rechargeable battery 102 has been fully charged or once a user wishes to remove the rechargeable battery 102 from the battery charger 100, the user moves the handle 116 from the first position to the second position (step 208). Then, the user slides the rechargeable battery 102 distally away from the battery charger 100 until the rechargeable battery 102 is separated from the battery charger 100 (step 209).

Various features of the disclosure are set forth in the following claims.

What is claimed is:

1. A battery charger for use with a rechargeable battery, the battery charger comprising:
   a housing including a connection rail, the connection rail configured to slidably interface with the rechargeable battery, the connection rail extending parallel to a plane;
   a handle movably coupled to the housing, the handle positionable in at least a first position and a second position; and
   wherein,
   in the first position, at least a portion of the handle intersects with the plane,
   in the second position, the plane is unobstructed by the handle, and
   the connection rail is disposed on an exterior of the housing regardless of whether the handle is in the first position or in the second position.

2. The battery charger of claim 1, wherein the handle is disposed on a longitudinal end of the housing.

3. The battery charger of claim 1, wherein, in the second position, the handle allows for removal of the rechargeable battery.

4. The battery charger of claim 3, wherein, in the first position, the handle blocks removal of the rechargeable battery.

5. The battery charger of claim 1, wherein the handle is pivotable from the first position to the second position.

6. The battery charger of claim 1, wherein
   the housing further includes a foot for engaging a support surface, and at least a portion of the handle is nearer the foot in the second position than in the first position.

7. The battery charger of claim 1, wherein
the handle includes a grip portion, and
in the first position, the grip portion of the handle is aligned with a center of gravity of a combination of the battery charger and the rechargeable battery in a direction parallel to the plane.

8. The battery charger of claim 1, wherein the rechargeable battery further includes a guiding rail configured to slidably interface the connection rail.

9. The battery charger of claim 1, wherein, in the first position, the handle is configured to lock the rechargeable battery in place.

10. The battery charger of claim 1, wherein
the housing defines a battery receiving area having a battery entry end, and
the handle is coupled to the housing adjacent the battery entry end of the battery receiving area.

11. The battery charger of claim 10, further comprising charging terminals disposed in the battery receiving area opposite the battery entry end.

12. The battery charger of claim 10, wherein
the battery receiving area is open in a D1 direction and a D2 direction,
the D1 direction is parallel to the connection rail,
the D2 direction is perpendicular to the D1 direction and the connection rail, and
the connection rail prevents removal of the rechargeable battery in the D2 direction.

13. The battery charger of claim 1, wherein at least a portion of the handle is disposed inside the housing.

14. The battery charger of claim 1, wherein the handle is pivotally coupled to the housing about a pivot axis, wherein the pivot axis extends through at least a portion of the housing.

15. A battery charger for use with a rechargeable battery, the battery charger comprising:
a housing defining a battery receiving area having a battery entry end and a longitudinal battery sliding axis extending through the battery entry end;
a handle movably coupled to the housing, the handle positionable in at least a first position and a second position; and
wherein
in the first position, at least a portion of the handle obstructs at least a portion of the battery entry end in a direction parallel to the longitudinal battery sliding axis,
in the second position, the battery entry end is unobstructed by the handle in the direction parallel to the longitudinal battery sliding axis, and
the battery receiving area is configured to be at least partially occupied by the rechargeable battery but is otherwise at least partially uncovered regardless of whether the handle is in the first position or in the second position.

16. The battery charger of claim 15, wherein
the handle includes a grip portion, and
in the first position, the grip portion of the handle is aligned with a center of gravity of the combination of the battery charger and the rechargeable battery in a direction parallel to the plane.

17. The battery charger of claim 15, wherein
the battery receiving area is open in a D1 direction and a D2 direction, the D2 direction being perpendicular to the D1 direction, and
the D1 direction extends away from the housing parallel to the longitudinal battery sliding axis, and the D2 direction extend in a vertical direction from the longitudinal battery sliding axis.

18. The battery charger of claim 17, wherein
the rechargeable battery is removable along the longitudinal battery sliding axis in the D1 direction, and
the housing prevents removal of the rechargeable battery in the D2 direction.

19. The battery charger of claim 15, wherein the housing further comprises a connection rail configured to slidably interface with the rechargeable battery along the longitudinal battery sliding axis.

20. The battery charger of claim 15, wherein at least a portion of the handle is disposed inside the housing.

21. A method of coupling a rechargeable battery to a battery charger, the method comprising:
sliding the rechargeable battery along a connection rail;
engaging charging terminals of the battery charger with corresponding battery terminals of the rechargeable battery;
moving a handle of the battery charger to a first position from a second position, thereby obstructing removal of the rechargeable battery;
applying a removal force to the rechargeable battery while the handle is in the first position; and
applying an opposite obstruction force to the rechargeable battery with the handle while the handle is in the first position.

22. The method of claim 21, wherein
moving the handle of the battery charger to a first position includes pivoting the handle relative to the housing along a pivot arc.

23. The method of claim 21, wherein
moving the handle of the battery charger to the first position comprises aligning a grip portion of the handle with a center of gravity of the combination of the battery charger and the rechargeable battery in a direction parallel to the connection rail.

24. The method of claim 21, further comprising
aligning a guiding rail of the rechargeable battery with the connection rail.

25. The method of claim 21, wherein applying a removal force to the rechargeable battery while the handle is in the first position includes contacting the rechargeable battery.

* * * * *